United States Patent [19]
Jackson et al.

[11] Patent Number: 5,561,745
[45] Date of Patent: Oct. 1, 1996

[54] COMPUTER GRAPHICS FOR ANIMATION BY TIME-SEQUENCED TEXTURES

[75] Inventors: Michael D. Jackson, Sandy; Kellan L. Hatch, Murray, both of Utah

[73] Assignee: Evans & Sutherland Computer Corp., Salt Lake City, Utah

[21] Appl. No.: 961,748

[22] Filed: Oct. 16, 1992

[51] Int. Cl.⁶ ........................................ G06F 3/14
[52] U.S. Cl. .......................... 395/119; 395/125
[58] Field of Search .................... 395/119, 125, 395/127, 152, 130, 129

[56] References Cited

U.S. PATENT DOCUMENTS

| | | | |
|---|---|---|---|
| 4,463,372 | 7/1984 | Bennett | 358/22 |
| 4,472,732 | 9/1994 | Bennett | 358/22 |
| 4,645,459 | 2/1987 | Graf et al. | 395/127 |
| 4,935,879 | 6/1990 | Ueda | 395/130 |
| 4,953,107 | 8/1990 | Hedley et al. | 395/152 |
| 5,077,608 | 3/1991 | Dubner | 395/119 |
| 5,194,969 | 3/1993 | DiFrancesco | 358/463 |
| 5,226,109 | 7/1993 | Dawson et al. | 395/120 |

OTHER PUBLICATIONS

Foley et al, "Computer Graphics and Principles and Practice", 1990, Plates, 11.25, 11.26, 11.35, 11.36.
Blinn, J. F., and Newell, M. E.; Texture And Reflection In Computer Generated Image, pp. 456–461, 1976 Pennsylvania.
Miller, G., and Hoffman, C. R.; Illumination And Reflection Maps: Simulated Objects In Simulated And Real Environments, pp. 1–2, Jul. 24, 1984, Minneapolis, MN.
Clark, L. C. and Brown, T. C.; Photographic Texture And CIG: Modeling Structures For Production Data Bases, pp. 274–283, 1987, U.S.

*Primary Examiner*—Heather R. Herndon
*Assistant Examiner*—Cliff Nguyen Vo
*Attorney, Agent, or Firm*—Darby & Darby P.C.

[57] ABSTRACT

In a computer graphics system, wherein three-dimensional data is processed to produce dynamic displays, two-dimensional texture images are sequentially mapped onto objects in the display to form movable animated figures. Objects receiving two-dimensional texture maps may be transparent and take specific forms for certain effects, for example, intersecting planes, stamps, moving objects, and so on. Texture maps are composed utilizing a variety of source devices including: computer graphics systems, video cameras, two-dimensional scanners.

19 Claims, 4 Drawing Sheets

COMPUTER GRAPHICS FOR ANIMATION BY TIME-SEQUENCED TEXTURES

FIELD OF THE INVENTION

The present invention relates generally to computer graphics. More specifically, the present invention relates to animation in computer graphics.

BACKGROUND AND SUMMARY OF THE INVENTION

At present, video games are perhaps the best known form of computer graphics apparatus. However, the field embraces many other systems as for use in training, design, entertainment, modeling, and so on. Typically, computer graphics systems give the viewer the impression of looking through a window at a picture, somewhat like a television display.

To generate a picture, advanced computer graphics systems select content from basic forms (primitives), orient the selected forms with respect to a viewpoint, account for hidden surfaces, then process picture elements (pixels) to develop individual fragments of the display which are scanned line by line to activate the display as in a raster pattern.

Typically, primitives or objects are mathematically defined and stored in three dimensional world space in what is sometimes referred to as an environmental memory. Conventional techniques involve selecting object data from the environmental memory that is relevant to a desired scene, transforming the data representative of such objects into a convenient coordinate system for relationship to a selected viewpoint and clipping or cutting away parts of the objects that are outside the field of vision. Then the object data is scan converted and processed into an array of picture elements (pixels) that are displayed collectively to represent an image display.

Processing for individual pixels involves determining the objects to be represented in each pixel as with regard to hidden surfaces, boundaries, or object transparency. Object data may be combined, as by blending to avoid jagged lines or edges, then shaded or textured to accomplish various surface effects or patterns. Conventionally the processed pixel data is stored in a frame buffer from which it is cyclically fetched to drive a scan line raster display, as in a cathode ray tube (CRT).

Computer graphics techniques for texturing surfaces have long been well known, as to lay a pattern on a specific surface. For example, texture may be obtained by sampling a photographic image containing a desired texture and mapping the texture onto a smooth surface in a display. Such techniques are disclosed in both of the books, *Principles of Interactive Computer Graphics,* Second Edition, Newman & Sproul, McGraw-Hill Book Company, 1979, and *Computer Graphics—Principles and Practice,* Second Edition, Foley, van Dam, Feiner, and Hughes, Addison-Wesley Publishing Company, Inc., 1990.

Generally, previous implementations of traditional texturing involve mapping a two-dimensional surface pattern onto an object. Typically the texture pattern represents a digitized texture that may be disposed on either a planar or a curved surface. In addition to texturing an object simply with a pattern, as to depict bricks, texturing techniques also have been proposed to accomplish other effects. For example, contour displays have been accomplished using texturing techniques as disclosed in U.S. Pat. No. 4,855,934, entitled System for Texturing Computer Graphics Images, granted Aug. 8, 1989, to John Robinson. Generally, the system of the present invention involves the use of two-dimensional texturing techniques to accomplish further special effects and images in computer generated displays, as movement or animation by a subject.

Computer graphics systems capable of providing dynamic displays, including animated objects, are well known and widely used. For example, such computer graphics system have been widely used in aircraft simulators for training pilots. Such graphic display systems may provide one or more window views, depicting a flight path and including moving objects. Generally, traditional techniques for accomplishing animation in such displays necessitate complex and extensive processing operations. Conventionally, such systems require a vast quantity of computation for each frame of a rapidly changing display. Accordingly, a continuing need exists for techniques and systems to simplify the generation of animated displays.

Quite independently of computer graphics animation techniques, it has been proposed to accomplish improved displays by using two-dimensional texturing techniques to depict visual images, for example, foliage on trees. In such displays, traditional techniques have processed three-dimensional graphics data to accomplish the major substance of a display then, two-dimensional texture is applied to represent details of trees. Of course, such techniques have limitations, for example substantial displacement of a viewpoint may reveal defects in the two dimensional components of the display. In any event, while such techniques have been useful traditionally, their application has been limited to represent static image components.

Generally, the system of the present invention involves the use of sequenced two-dimensional texture maps to provide an animated object in a computer graphics display. Somewhat broadly, the system involves the use of animation sequences mapped on an object somewhat in the manner of traditionally mapping texture patterns onto an object. To consider a specific example, an object might be formulated defining a transparent planar surface facing the viewpoint. A series or set of texture maps bearing an animated figure then may be mapped sequentially onto transparent objects to provide a dynamic display. In that regard, the transparent object reveals only the figure on the so-called "texture map" which is not, in fact, a traditional texture pattern, but rather is an animation sequence. Accordingly, the composite display reveals the animated figure as a dynamic image component. Such techniques afford considerable economy in processing with resultant savings of time and memory capacity and provide a method for displaying interactive figures involved in complex motion.

The system of the present invention further contemplates the utilization of specific object forms to accomplish particular results. For example, an object carrying an animated texture display may take the form of a so-called "stamp" as well known in the art, consisting of an object defining a plane that is maintained perpendicular to the line of sight from the viewpoint. An object in the form of multiple intersecting planar sheets also has been determined to afford useful animated texture displays. Furthermore, the object bearing an animated figure may be part of a dynamic coordinate system whereby further movement may be imparted to the object.

Further aspects of the present invention involve techniques for developing two-dimensional data for the creation of animation texture maps. Specifically in that regard, various techniques may include scanned data, video-based data, computer graphics generated data, and so on. Accordingly, two-dimensional data may be variously formulated, as an animation sequence of a figure, for application to a transparent display object to accomplish any of a variety of depicted figure motions within a display. By cyclically, or otherwise repeating, the application of the two-dimensional data to the object, prolonged dynamic displays can be accomplished. As a result, improved displays can be afforded with economy and efficiency. Conversely, nonrepeating sequences may be displayed to represent figure motions which are not cyclical in nature.

BRIEF DESCRIPTION OF THE DRAWINGS

A complete understanding of the invention and its advantages may be gained from a consideration of the following description of the preferred embodiment taken in conjunction with the accompanying dryings, in which.

DESCRIPTION OF THE ILLUSTRATIVE EMBODIMENT

Figure 1:
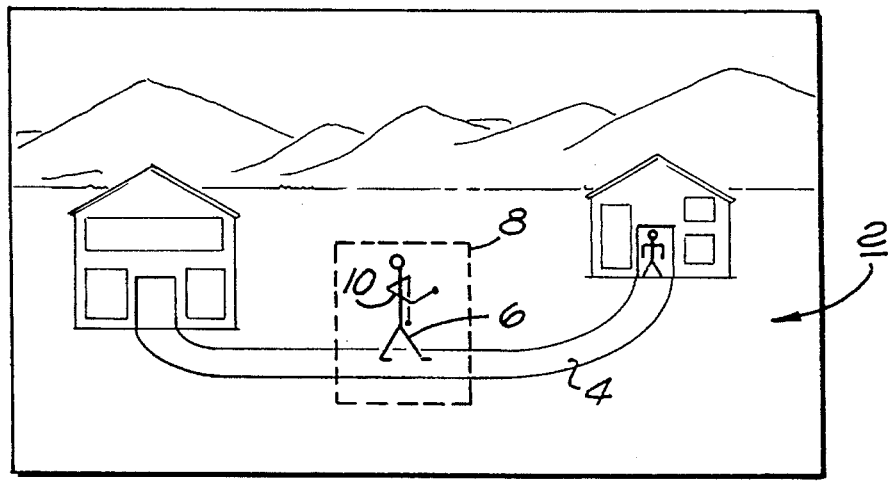
FIG. 1 is a graphic representation illustrating the use of two-dimensional data in a computer graphics display to create animation by texturing techniques.

Referring initially to FIG. 1, a display is depicted indicating a graphics computer scene 2 containing a path 4 bearing a figure of a human. For purposes of explanation, the simple illustration is used to represent the human 6 performing an arm-waving motion. Generally, with the exception of the human 6, the scene 2 is composed of three-dimensional data. However, the human 6 is a manifestation of two-dimensional data mapped into the display, in the manner of texture on a transparent object 8.

Recapitulating to some extent, it is to be understood that the major components of the scene 2, except the human 6 would be generated using conventional computer graphic techniques wherein three-dimensional objects are stored in world space by an environmental memory from which data is selected, transformed, clipped and otherwise processed to formulate individual pixels, as traditionally for a graphics display. Typically, such displays are executed using raster scan techniques as well known in television receivers. That is, individual frames of a dynamic display are composed in sequence to accomplish a dynamic image. As indicated above, such displays of complex dynamic computer graphic images are well known in the prior art.

For the development of the scene 2, three-dimensional geometric or object data, including the transparent object 8 would be drawn from an environmental memory. That is, the object 8 is simply a transparent three-dimensional object defined in world space within the environmental memory for a display appropriate to particular scenes. The accomplishment and processing of the transparent object 8 for the display of the scene 2 would be substantially in accord with conventional technology. Also in accordance with current technology, it is to be understood that virtually any object in a computer graphics display can be mapped with a texture. For example, as indicated above, a brick texture can be mapped readily onto the surface of an object.

Essentially, in accordance herewith, the human 6 is carried by a texture map and applied to the transparent object 8. Accordingly, the two-dimensional human 6 is introduced into the scene 2 as described in detail below and by sequencing a series of texture maps of the human 6 onto the object 8, animation is accomplished. That is, synchronously with frames of the dynamic display, two-dimensional data representing the human 6 in an animated sequence are mapped on the object 8. As a consequence, the human 6 is seen to move, thus animating a waving arm.

Considering the system in somewhat greater detail with reference to the simplistic display of FIG. 1, it is to be understood that a sequence or set of texture maps is stored carrying the animated sequence for the human 6. Note that although the terms "texture" and "texture map" are extensively used herein, their use relates to the conventional computer graphic techniques of texturing objects. Such use is not to suggest the imparting of a static pattern, i.e. bricks or the like to a surface in a display. Still, texture maps comprise two-dimensional data, somewhat traditionally defined in a so-called "u, v" coordinate system.

Figure 2:
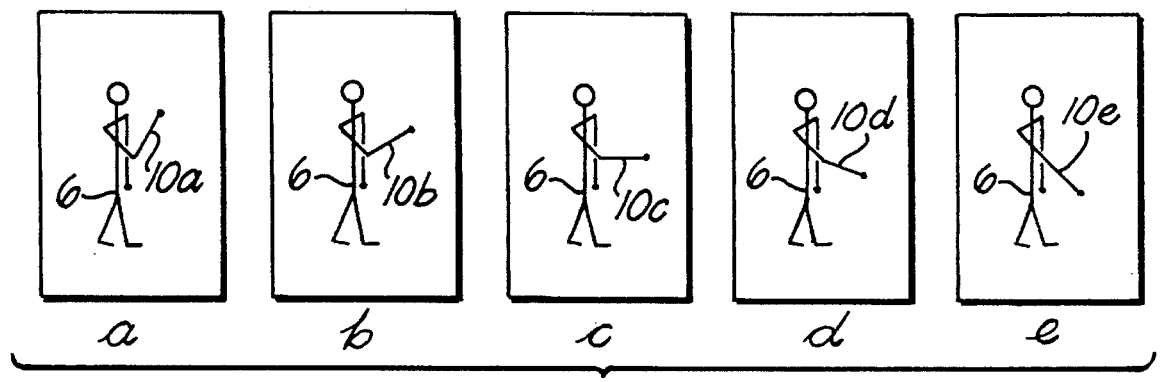
FIG. 2 is a series of graphic representations as may be employed in the display represented in FIG. 1.

With regard to the human 6 of FIG. 1, it is to be understood that an animated sequence is stored by individual texture maps as represented in FIG. 2. To simplify the explanation, the texture maps of FIG. 2 depict the human 6 in a similar position except for the position of an arm 10. That is, the body of the human 6 is static except for the arm 10 which is shown in a series of displaced positions 10a through 10e respectively in the FIGS. 2(a) through FIG. 2(e). Specifically, FIG. 2(a) shows the human with the arm 10a somewhat raised. In FIG. 2(b), the arm 10b has been lowered slightly, while in the FIGS. 2(c), 2(d) and 2(e) the arm progressively is moved to a low position. Thus, the sequence animates arm motion of the human 6 from a raised position (10a) to a lowered position (10e). Viewed in a rapidly-sequenced cyclic frame-by-frame display, continuous waving motion is perceived. Note, the pattern of display would be 10a–10c followed by 10d–10a and so on cyclically. Various cycles may be employed for various effects. Repeated sequences can thus convey the appearance of the human 6 waving the arm 10.

In a sense, the animation of the present system may be analogized to graphic arts animation utilizing transparent celluloid sheets (cels) bearing sequences of a figure depicting motion. Note, however, that the transparent object 8 (FIG. 1) can be three-dimensional. Also, the object 8 may be implemented as various objects, as a so-called "stamp", and the object's geometry can be transformed as well throughout the animation. Accordingly, the analogy to eels, is quite limited.

With regard to the three-dimensional characteristic of the object 8, distinct configurations and shapes afford interesting and effective image simulation. For example, a three-dimensional object in the form of intersecting planes will now be considered.

Figure 3:
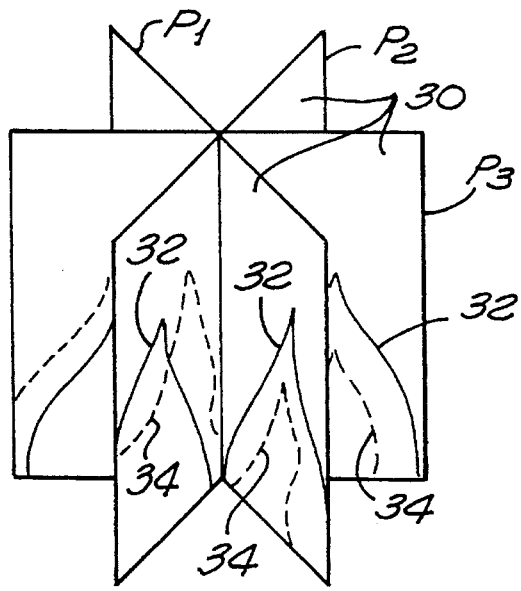
FIG. 3 is a perspective view of an object for use in a system of the present invention.

FIG. 3 illustrates a symmetrical object including three radially off-set centrally intersecting planes P1, P2 and P3. As indicated above, the object of FIG. 3 is transparent; however, it defines six planar surfaces 30 for receiving two-dimensional image data, e.g. texture maps. Accordingly, interesting effects can be accomplished in a display. Note that in a dynamic coordinate system, the object in FIG. 3 can move about, rotate, tumble, and so on.

In one application, the object of FIG. 3 has been determined to be very effective to represent a fire. In that regard, flame texture sequences are depicted on the surfaces 30. Specifically, two flame representations are represented on the surfaces 30, specifically representations 32 and 34. Generally, several individual texture maps would be employed to represent a dancing flame sequence. Note that the object of FIG. 3 could grow to depict a growing fire and move to depict a moving burning object, and the animation texture sequence could be cycled to repeat the dancing flames in the display.

As indicated above, various three-dimensional objects may be stored in accordance herewith, defining surfaces to receive mapped two-dimensional images. As mentioned, a so-called "stamp" affords interesting and important display techniques. Also, as indicated above, utilizing the transparent object in a dynamic coordinate system attains important displays.

Figure 4:
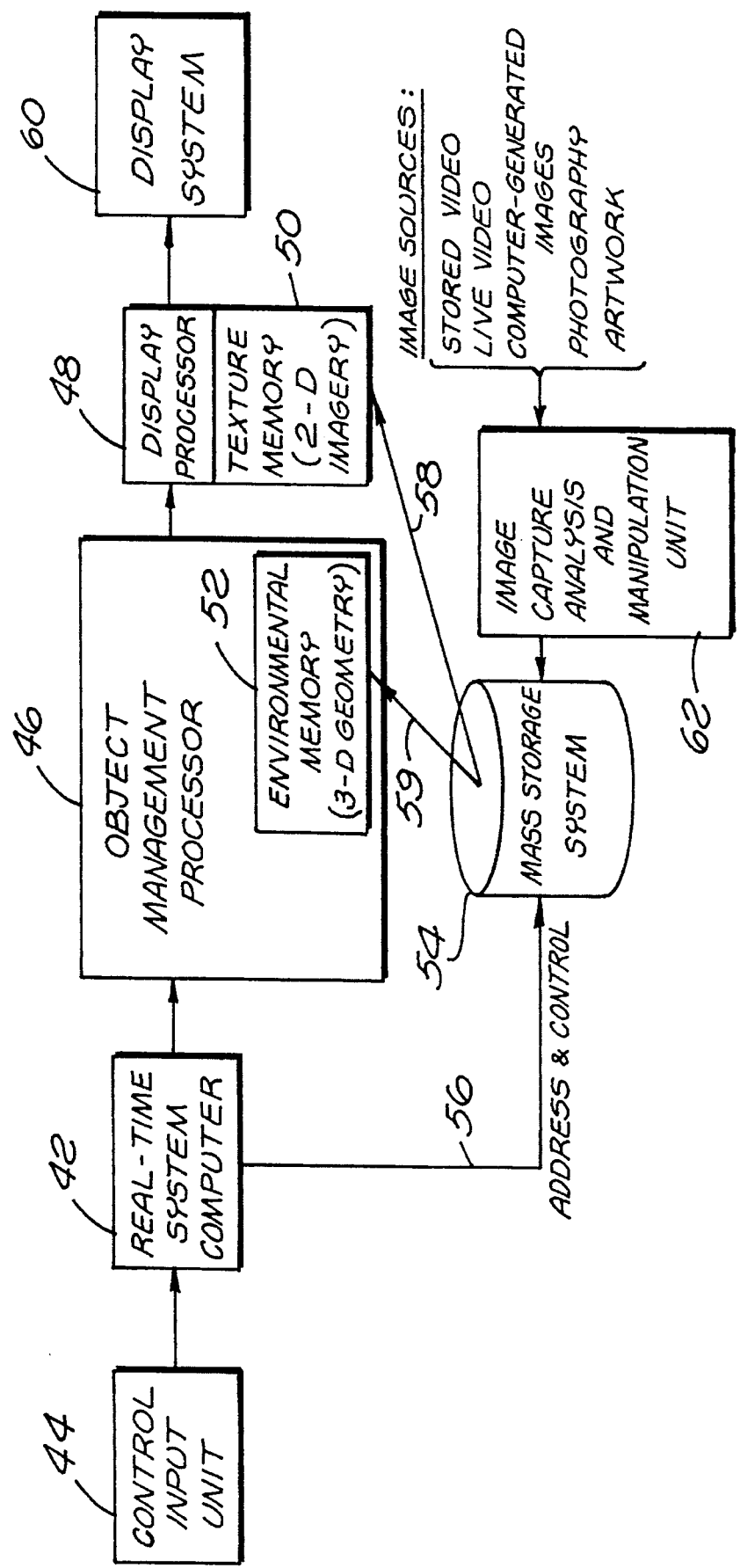
FIG. 4 is a block diagram of a computer graphics system in accordance with the present invention.

Turning now to the structure of an exemplary embodiment, reference will be made to FIG. 4 showing a real-time system computer 42 functioning as a system controller as conventionally employed in computer graphics systems. For example, the computer 42 may take the form of a Motorola Model MVME147S-1 available from that company with an address in Phoenix, Ariz.

The real-time system computer 42 is served by a control input unit 44 which may take various forms including a manual input terminal, another computer, or virtually any source of control input information. Essentially, the input unit 44 interfaces the real-time computer 42 for driving an object management processor 46. Functionally, the object management processor 46 is intimately associated with a display processor 48 that incorporates a texture memory 50. An environmental memory 52 is incorporated in the object management processor 46. Note that the combination of the object management processor 46 and the display processor 48 may take the form of a model ESIG-3000 image generator available from Evans & Sutherland Computer Corporation, with offices in Salt Lake City, Utah.

The texture memory 50 within the processor 48, and the environmental memory 52 within the processor 46 may receive data from a mass storage 54 controlled by the computer 42 as indicated by a control path 56. As suggested by the drawing, the mass storage 54 may take the form of disk storage coupled for the transfer of data to both the texture memory 50 and the environmental memory 52 as indicated by the lines 59 and 58. In that regard, the texture memory 50 stores two-dimensional imagery to be texture mapped on surfaces of objects. The environmental memory 52 stores three-dimensional data defining objects in world space, sometimes referred to as geometric data.

Generally, world space objects are drawn from the environmental memory 52 for composing a picture or display, and additionally as transparent objects with a surface for receiving two-dimensional images from the texture memory 50 as to accomplish an animated sequence. Essentially, frames or images of such a sequence are defined by data from display processor 48 for manifestation by a display system 60. Conventional display systems utilizing a cathode ray tube (CRT) are satisfactory and are in widespread use. Essentially, the display processor 48 is provided data from the object manager processor 46 to accomplish individual picture elements (pixels) with texture, representations of which are supplied to the display system 60.

The mass storage system 54 receives data from an image capture, analysis and manipulation unit 62. In that regard, as indicated in FIG. 4, the unit 62 may utilize any of a variety of image sources, including: stored video signals, video signals from a live performance, computer-generated images, photography, art work, and so on.

Considering an example, interesting effects can be accomplished by suiting a human for a desired display and utilizing the camera to provide signals exemplary of an animation sequence performed by the person. Typically, by positioning the person before a monochromatic environment, the signals representative of the person alone can be isolated in accordance with well-known techniques. Further processing, as in the unit 62 produces signal representations in the mass storage system 54 that may be employed in the form of two-dimensional texture data or textured elements (texels) that are moved into the texture memory 50 for use in a particular display as explained above.

In the operation of the system as depicted in FIG. 4, the real-time system computer 42 along with the object management processor 46 and the display processor 48 function as a pipeline to provide drive signals for the display system 60. The computer 42 implements the subject matter of displays controlling the mass storage system 54 to load the texture memory 50 and the environmental memory 52. The object management processor 46 also is provided other data with the consequence that object data is supplied from the processor 46 to the display processor 48. The accumulation and preliminary processing of memory data to accomplish preliminary information for a display processor is well-known in the prior art. Accordingly, the display processor 48 receives basic data for processing object pixels for the display system 60. As indicated above, in the processor 48 the individual pixels receive a texture map. Accordingly, advanced displays can be accomplished with considerable economy.

Figure 5:
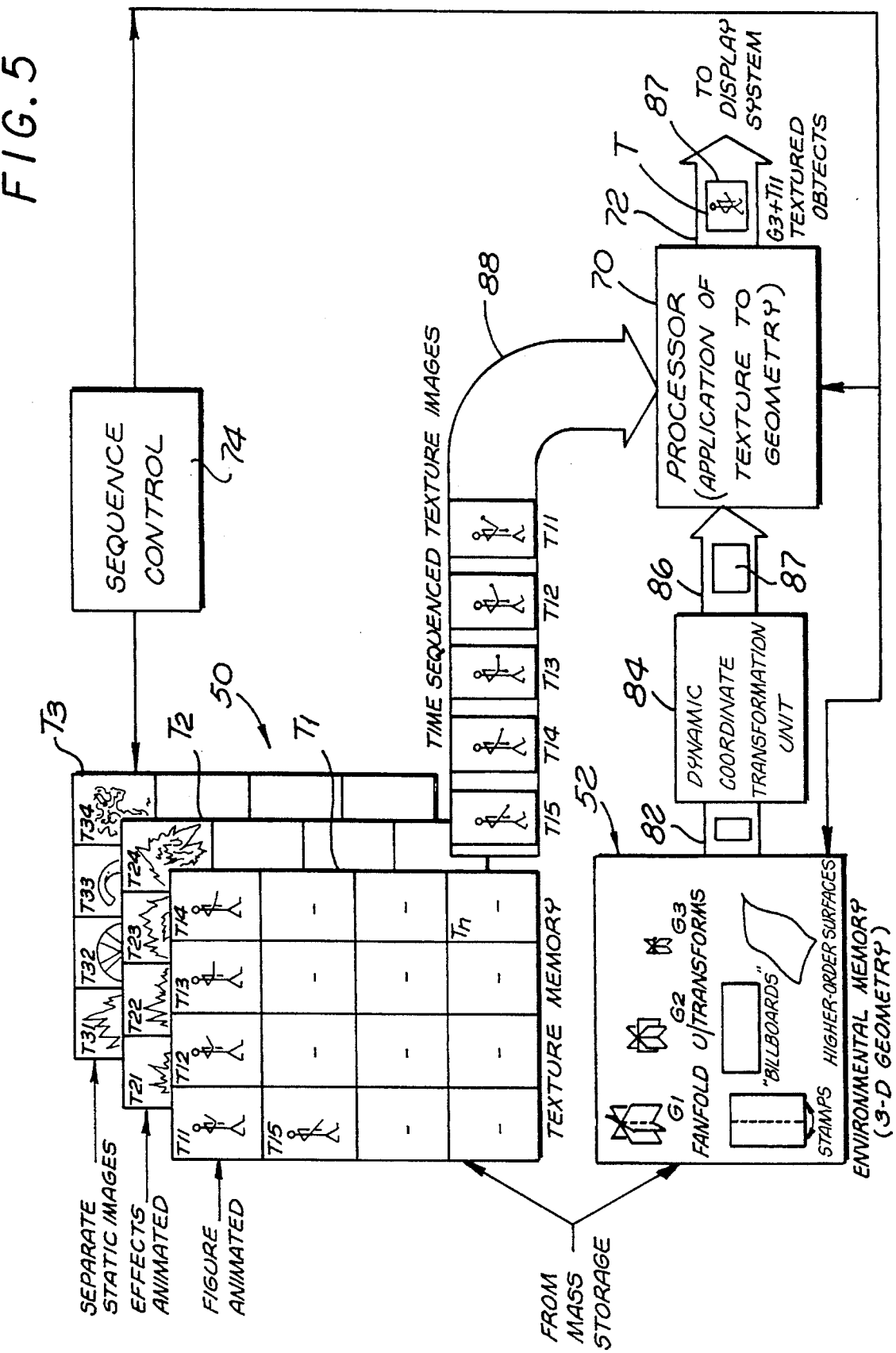
FIG. 5 is a detailed block and symbolic diagram of object management and display processors as may be used in the system of FIG. 4.

Referring now to FIG. 5, the object management processor 46 is shown in substantial detail along with the display processor 48. The texture memory 50 (upper left) is illustrated as a series of memory planes bearing sets or sequences of animation texture maps. Recognizing that the texture maps may be stored in virtually any configuration or memory organization, the texture memory 50 is illustrated with the texture maps in sequence planes, that is, individual two-dimensional maps designated to indicate plane and map, specifically, T11, T12, T13,–T34 and so on.

As suggested, the initial numeral (1 of T12) indicates the plane, the second numeral (2 of T12) indicates a position within the plane. For further convenience of explanation, the initial plane P1 stores figure animation sequence maps (human or animal); the second plane T2 stores animated effects as for fire, explosions and similar such figures; and the third plane T3 stores static image texture maps for use in non-animated displays. Again, the texture maps of the texture memory 50 are stored as two-dimensional data generated from a wide variety of different sources as mentioned above.

The environmental memory 52 (FIG. 5, lower left) also may be embodied in any of a wide variety of storage formats using various organizations as well known in the prior art. Specifically, the environmental memory 52 stores three-dimensional geometry data for individual objects in world space. However, with respect to the disclosed embodiment, the memory 52 specifically stores objects to provide surfaces for receiving texture maps as to accomplish animated displays.

As explained above, certain of the objects defined by data in the environmental memory 52 provide transparent surfaces on which displays may be mapped utilizing texturing techniques as to accomplish an animated figure moving within a scene composed by other objects drawn from the environmental memory 52. Examples of objects represented by data within the environmental memory 52 for use with texturing techniques as disclosed herein include several specific forms. As described in detail with reference to FIG. 3, one form comprises a multiplicity of intersecting planes which might be termed a "fan-fold." Such objects may be stored with transforms as well known in the prior art for altering the size of the object. Accordingly, as indicated above, a fan-fold object may be mapped with two-dimensional fire data and altered in size to represent a fire of increasing or decreasing magnitude. Also the object can be moved to depict a moving fire.

Other objects within the environmental memory 52 for use as described herein include so called "stamps" which as indicated above comprise a plane with a transform for maintaining the plane perpendicular to the viewpoint. In accordance herewith, some stored stamps are transparent for receiving figures as disclosed above.

Other objects for use in accordance herewith include "billboards" and higher-order surfaces both as well known in the prior art. A distinction for use herein involves such objects providing transparent surfaces.

As indicated in FIG. 5, the texture memory 50 and the environmental memory 52 supply data to a processor 70 which applies two-dimensional texture to three-dimensional geometry or objects as represented by a data symbol 87. Signals from the processor 70 define textured objects that are supplied through a path 72 to the display processor 48 (FIG. 4) as indicated in FIG. 5.

The operations of the texture memory 50 and the environmental memory 52 are synchronized by a sequence control unit 74. The resulting operations will now be considered in further detail with reference to a specific exemplary display.

Assume for example the need for an animated human image in a display somewhat as described with reference to FIGS. 1 and 2. Generally, the operations involve the generation of a typical dynamic computer graphics display with the addition of transparent objects (from the 3-D environmental memory 52) that carries sequences of texture maps depicting animation as described with reference to FIGS. 1 and 2.

To accomplish the operations, signals indicative of a stamp in the environmental memory 52 are called up by the real-time system computer 42 (FIG. 4) prompting such signals to be moved through a bus 82 through a dynamic coordinate transformation unit 84 and a bus 86 to the processor 70 as data 87. Dynamic coordinate transformation is well known in the computer graphics art as is the technique of transferring object representative signals. Accordingly, dynamically positioned geometry signals are provided through the bus 86 to the processor 70 for the application of texture maps received from the texture memory 50 as will now be considered.

In response to a command from the real-time system computer 42 (FIG. 4), the texture memory 50 (FIG. 5) provides a stream of texture-map data through a bus 88 to the processor 70 as illustrated. For example, the data carried by the bus 88 may represent a series of texture maps T11, T12, T13, T14 and T15 (See FIG. 2). As indicated above, the texture maps are received by the processor 70 for application to the object 87 as received from the environmental memory 52.

The processor 70 sequentially applies the texture maps T11, T12, T13, T14 and T15 to the transparent surface of the object represented by data 87, which in the example under consideration comprises a stamp. In sequence, the object data 87 bearing one of the texture maps T is provided from the processor 70 through the path 72 as illustrated to the display processor 48 (FIG. 4).

With the completion of signals representative of images, the display processor 48 provides individual pixels for the display using techniques as well known in the prior art. Accordingly, a raster-scan sequence of pixels is completed for delivery to the display system 60 to activate the desired animated dynamic display. Again, the utilization of two-dimensional texture images mapped onto transparent objects to accomplish animation affords considerable improvement in relation to image production capability and economy.

As indicated above, source material for the two-dimensional data may take many distinct forms. Exemplary forms and techniques for accomplishing texture data within the texture memory 50 (FIG. 5) will now be considered with respect to FIG. 6.

Figure 6:
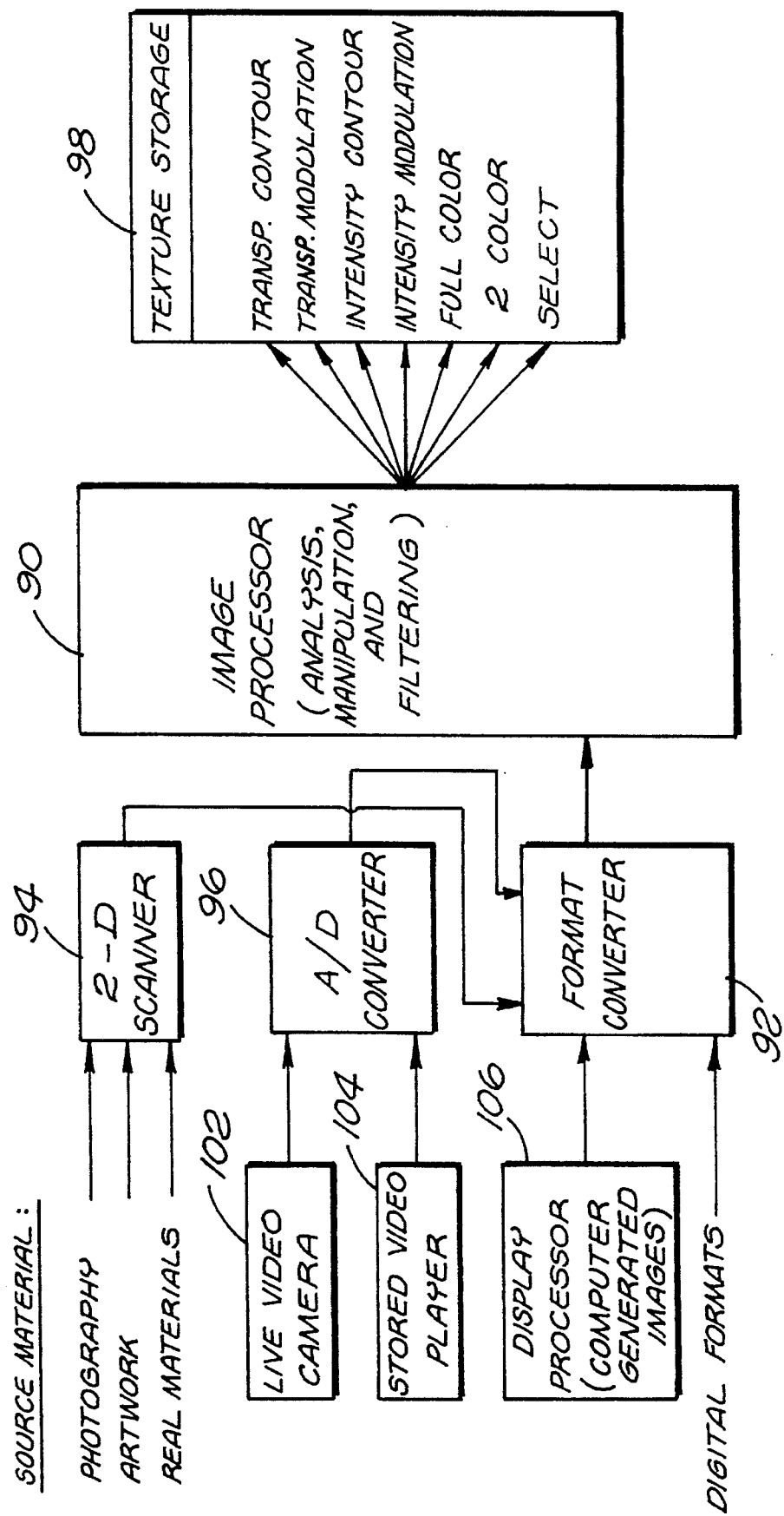
FIG. 6 is a detailed block diagram of an image capture unit as may be used in the system of FIG. 4.

As indicated above, texture maps may be created from a number of different sources. To consider specific techniques and apparatus for the creation of texture maps, FIG. 6 shows an image processor 90 (central) with the capability for analysis manipulation and filtering of raw two-dimensional data to accomplish texture maps. The processor 90 receives formatted data through a format converter 92 from both a two-dimensional scanner 94 and an analogue-digital convertor 96 to provide a multitude of texture maps in a storage 98. Note that the storage 98 may comprise a buffer for temporarily storing data in route to the texture memory 50 (FIG. 5). Alternatively, the storage 98 may actually comprise space within the texture memory.

Two-dimensional scanning devices that may function as the scanner 94 are very well known in the prior art as to provide a raster scan of a two-dimensional representation. For example, as indicated, photographs, art or actual materials may be scanned to accomplish textures maps for use in accordance herewith. In that regard, a series of photographs also may be used depicting stages of motion to provide animation texture maps. So also may art work be provided in sequences or sets to accomplish representative texture map signals. As another example, real materials with interesting textures have been used and arrangements can be provided to indicate motion sequence. For example, consider, sand, cereal grains, stones, and so on.

As indicated above, video signals also may be employed to generate sequence texture maps. As illustrated, the A–D converter is coupled to a live video camera 102 and a video player 104. With regard to the video camera 102, humans, or virtually any animal, can be a subject for the camera 102 and in that regard as indicated above, a person can be costumed to accomplish the desired subject of animation. Of course, multiple video camera sets are feasible and in that regard, various sensors may be utilized as for position signals and synchronously supplied to the format converter 92 as related digital formats for a performance before a video camera 102. The use of stored video signals as manifesting a performance is accomplished by the player 104 again; multiple players might be employed or multiple source signals might be combined.

As another example, computer-generated images afford a fertile source of texture map material. Such signals representing computer generated images are supplied to the format convertor 92 from a display processor 106 for possible further formatting and to interface the image processor 90. Some further comments with regard to computer generated images is appropriate.

Suppose for example a need to create an animated sequence of a human skeleton. Further, assume the skeleton is stored in environmental memory with the consequence that a wide range of two-dimensional representations are available. Accordingly, the three-dimensional skeleton data is manipulated to accomplish a sequence of two-dimensional animation representations, each being reduced to representative signals that are supplied as computer-generated images to the format convertor 92. Passing through the convertor 92, to the image processor 90, such signals are processed to accomplish a series of animation texture maps as explained above in the storage 98.

In view of the above, it will be apparent that a wide range of source materials afford considerable flexibility accommodating considerable creativity. Two-dimensional texture maps accordingly are available with relative economy to accomplish effective animated displays in accordance with the present system.

A multitude of other options and variations departing from those disclosed above are available without departing from the spirit of the invention. For example, multiple combinations exist for scaling and moving objects concurrently with a carried texture map. Multiple figures or textures may also be combined on a set of texture maps for further interesting effects thus, while certain exemplary operations have been explained herein, and certain detailed structures have been disclosed, the appropriate scope hereof is deemed to be in accordance with the claims as set forth below.

What is claimed is:

1. A computer graphics system for generating a graphics animation image defined by a line of sight from a viewpoint, comprising:

an image data processor and control apparatus to specify image data for a display of a subject with animate characteristics;

a geometric environmental data memory for storing three-dimensional geometric data for said display as in the form of multiple primitives, said three dimensional geometric data representative of at least one three-dimensional object being substantially transparent and positionable in various orientation and locations relative to said viewpoint, said object defined by a plurality of planes extending radially in three dimensions from a central axis, said object being rotatable about said central axis to enable surfaces of said planes to be alternately observable from said viewpoint;

a texture data memory for storing two-dimensional figure texture data for said display, texture map data representative of a plurality of varying static images of said subject; and an image rendering pipeline coupled to receive said three-dimensional geometric data and said two-dimensional figure texture data under control of said processor and control apparatus to map said texture map data as texture onto said surfaces of said transparent object for providing a dynamic animated display of said subject in animation with said animate characteristics by time sequencing said figure texture data in combination with said geometric data and rotating said transparent object about said central axis.

2. A computer graphics system according to claim 1 wherein said data defining said transparent object defines at least one figure as a stamp facing the viewpoint of a display.

3. A computer graphics system according to claim 1 wherein said geometric environmental data memory stores at least one figure as a higher-order surface.

4. A computer graphics system according to claim 1 wherein said transparent object defines at least one figure as a billboard.

5. A computer graphics system according to claim 1 wherein said geometric environmental data memory stores data for dynamically positioned geometry, and said pipeline processes said data for dynamically positioned geometry.

6. A computer graphics system according to claim 1 wherein at least some of said two-dimensional figure texture data define sets of texture maps for display in sequence on objects to provide animation.

7. A computer graphics system according to claim 6 wherein said two-dimensional figure data depicts animate subject in motion.

8. A system according to claim 1 further including a video signal source for providing said two-dimensional figure texture data to said texture data memory.

9. A system according to claim 8 wherein said video source comprises a video camera.

10. A computer graphics system according to claim 1 further including a computer display processor for providing said two-dimensional figure texture data to said texture data memory.

11. A computer graphics system according to claim 1 further including a two-dimensional scanner for providing said two-dimensional figure texture data to said texture data memory.

12. A process for generating computer graphics displays of an animated sequence of a subject with animate characteristics, said displays defined by a line of sight from a viewpoint, comprising the stages of:

developing geometric three-dimensional data representative of at least one transparent object positionable in various orientation and locations relative to said viewpoint, said object defined by a plurality of planes extending radially in three dimensions from a central axis, said object being rotatable about said central axis to enable surfaces of said planes to be alternately observable from said viewpoint;

storing said geometric three-dimensional data;

developing two-dimensional texture data representative of a plurality of varying static images of said subject;

storing said two-dimensional texture data;

mapping said two-dimensional texture data on said surfaces by pipeline operation and time sequencing to provide a texture mapped data sequence; and displaying said texture mapped data sequence as an animated display to provide said animated sequence in accordance with said plurality of varying static images, wherein said transparent object is rotated about said central axis.

13. A process according to claim 12 wherein said step of developing two-dimensional texture data comprises sensing either a live or a stored video signal.

14. A process according to claim 12 wherein said step of developing two-dimensional texture data comprises scanning a two-dimensional image.

15. A process according to claim 12 wherein said step of developing two-dimensional data comprises forming a computer-generated image in a display processor.

16. A process according to claim 12 wherein said step of developing three-dimensional data includes a step of developing data representative of an object defining multiple intersecting planes.

17. A process according to claim 12 wherein said step of developing three-dimensional data includes a step of developing data representative of a stamp.

18. A process according to claim 12 wherein said step of developing three-dimensional data includes a step of developing data representative of a higher-order surface, 19. A process according to claim 12 wherein said step of displaying said texture map data further includes displaying dynamically positioned geometry.

* * * * *

UNITED STATES PATENT AND TRADEMARK OFFICE
CERTIFICATE OF CORRECTION

PATENT NO. : 5,561,745
DATED : October 1, 1996
INVENTOR(S) : Michael D. Jackson et al.

It is certified that error appears in the above-indentified patent and that said Letters Patent is hereby corrected as shown below:

Title page, item [54] and col. 1, line 1-2;
Title of the invention should be changed from "COMPUTER GRAPHICS FOR ANIMATION BY TIME-SEQUENCED TEXTURES" to --COMPUTER GRAPHICS SYSTEM FOR ANIMATION BY TIME-SEQUENCED TEXTURES--;

Column 3, line 20, change "dryings" to --drawings--;

Column 3, line 42, insert --6-- after "human";

Column 4, line 57, change "eels" to --cels--;

Column 5, line 67, change "manager" to --management--;

Column 6, line 53, change "P1" to --T1--; and

Column 12, line 3, delete the comma after "surface" and insert a period.

Signed and Sealed this

Eleventh Day of March, 1997

Attest:

BRUCE LEHMAN

*Attesting Officer*  *Commissioner of Patents and Trademarks*